United States Patent
Oh et al.

(10) Patent No.: US 12,506,626 B2
(45) Date of Patent: Dec. 23, 2025

(54) METHOD AND APPARATUS FOR DISTRIBUTED CONSENSUS IN CONSIDERATION OF SHARE PROPORTIONS OF NODES AND METHOD OF GENERATING BLOCKCHAIN USING THE SAME

(71) Applicant: ELECTRONICS AND TELECOMMUNICATIONS RESEARCH INSTITUTE, Daejeon (KR)

(72) Inventors: Jin-Tae Oh, Daejeon (KR); Ki-Young Kim, Daejeon (KR); Young-Chang Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 582 days.

(21) Appl. No.: 17/870,633

(22) Filed: Jul. 21, 2022

(65) Prior Publication Data
US 2023/0066169 A1    Mar. 2, 2023

(30) Foreign Application Priority Data

Aug. 10, 2021   (KR) .................. 10-2021-0105386
May 18, 2022   (KR) .................. 10-2022-0060794

(51) Int. Cl.
*H04L 9/00*   (2022.01)
*H04L 9/08*   (2006.01)

(52) U.S. Cl.
CPC ............... *H04L 9/50* (2022.05); *H04L 9/085* (2013.01); *H04L 2209/463* (2013.01)

(58) Field of Classification Search
CPC ..... H04L 9/50; H04L 9/085; H04L 2209/463; H04L 9/3255; G06F 21/64
See application file for complete search history.

(56) References Cited

U.S. PATENT DOCUMENTS 11,343,073 B2    5/2022   Oh
2019/0068380 A1*   2/2019   Tang .................. A61M 5/172
(Continued)

FOREIGN PATENT DOCUMENTS

KR    10-2019-0054738 A    5/2019
KR    10-2020-0144466 A    12/2020

OTHER PUBLICATIONS

Yossi Gilad et al., "Algorand : Scaling Byzantine Agreements for Cryptocurrencies," Proceedings of the 26th Symposium on Operating Systems Principles, Oct. 14, 2017.
(Continued)

*Primary Examiner* — Farid Homayounmehr
*Assistant Examiner* — Suman Debnath (57) ABSTRACT

Disclosed herein is a method for distributed consensus. The method includes performing, by each of nodes forming a blockchain, an operation corresponding to a success probability (p) a number of times corresponding to the share value thereof; sending, by nodes having at least one share corresponding to the operation which is successful, a message for being selected as consensus nodes; and performing, by the consensus nodes, which are nodes having consensus shares selected from among the shares corresponding to the operation which is successful, distributed consensus. Here, the nodes forming the blockchain include major shareholder nodes for processing transactions.

12 Claims, 7 Drawing Sheets

(56) References Cited

U.S. PATENT DOCUMENTS

| | | |
|---|---|---|
| 2019/0097790 A1* | 3/2019 | Li .............................. H04L 9/12 |
| 2019/0147438 A1 | 5/2019 | Micali |
| 2019/0327084 A1 | 10/2019 | Oh |
| 2019/0332586 A1* | 10/2019 | Wang ................... G06Q 20/223 |
| 2019/0379538 A1* | 12/2019 | Oh ........................ H04L 9/0643 |
| 2020/0026699 A1 | 1/2020 | Zhang |
| 2020/0403776 A1 | 12/2020 | Oh |
| 2021/0297267 A1 | 9/2021 | Tang |

OTHER PUBLICATIONS

"Proof of stake," Wikipedia, Jul. 24, 2021.
Jintae Oh et al., "Algorithm based on Byzantine agreement among decentralized agents (BADA)," ETRI Journal, Oct. 20, 2020.

* cited by examiner

| NODE NUMBER | SHARE VALUE | TRANSACTIONS |
|---|---|---|
| 1 | 9 | 10,000 |
| 2 | 9 | 10,000 |
| 3 | 9 | 10,000 |
| 4 | 9 | 10,000 |
| 5 | 9 | 10,000 |
| 6 | 9 | 10,000 |
| 7 | 9 | 10,000 |
| 8 | 9 | 10,000 |
| 9 | 9 | 10,000 |
| 10 | 9 | 10,000 |
| 11 | 1 | 0 |
| 12 | 1 | 0 |
| ⋮ | ⋮ | ⋮ |
| ⋮ | ⋮ | ⋮ |
| 99 | 1 | 0 |
| 100 | 1 | 0 |

| NODE NUMBER | SHARE VALUE 1 | SHARE VALUE 2 |
|---|---|---|
| 1 | 9 | 1 |
| 2 | 9 | 1 |
| 3 | 9 | 1 |
| 4 | 9 | 1 |
| 5 | 9 | 1 |
| 6 | 9 | 1 |
| 7 | 9 | 1 |
| 8 | 9 | 1 |
| 9 | 9 | 1 |
| 10 | 9 | 1 |
| 11 | 1 | 9 |
| 12 | 1 | 9 |
| 13 | 1 | 9 |
| 14 | 1 | 9 |
| 15 | 1 | 9 |
| 16 | 1 | 9 |
| 17 | 1 | 9 |
| 18 | 1 | 9 |
| 19 | 1 | 9 |
| 20 | 1 | 9 |
| 21 | 1 | 1 |
| 22 | 1 | 1 |
| ⋮ | ⋮ | ⋮ |
| 99 | 1 | 1 |
| 100 | 1 | 1 |

METHOD AND APPARATUS FOR DISTRIBUTED CONSENSUS IN CONSIDERATION OF SHARE PROPORTIONS OF NODES AND METHOD OF GENERATING BLOCKCHAIN USING THE SAME

CROSS REFERENCE TO RELATED APPLICATIONS

This application claims the benefit of Korean Patent Application No. 10-2021-0105386, filed Aug. 10, 2021, and No. 10-2022-0060794, filed May 18, 2022, which are hereby incorporated by reference in their entireties into this application.

BACKGROUND OF THE INVENTION

1. Technical Field

The present invention relates generally to technology for distributed consensus in blockchain, and more particularly to a method for forming a consensus congress for Byzantine fault-tolerant distributed consensus and a method of generating a blockchain using the same.

2. Description of the Related Art

Blockchain is technology enabling transactions to be successfully performed and safely managed without a trusted third party. In an existing centralized system, a trusted third party exclusively manages a centralized ledger in order to prevent transaction information from being tampered with, thereby indirectly and manually guaranteeing trust. In blockchain technology, a ledger is managed in a distributed manner through a consensus algorithm, that is, a method of making nodes directly participate in consensus, instead of entrusting a trusted third party with the task of guaranteeing trust in an indirect and manual manner.

Meanwhile, candidate nodes for generating a new block are required to receive transactions. When the number of such nodes increases, the network cost for transferring transactions also increases. For example, when a competitive consensus method (PoW, PoS, or the like) is used, as in Bitcoin, Ethereum, and the like, network cost is incurred in order to transfer transactions to be processed to all full nodes. However, in most competitive consensus methods, the cost of transferring transactions has little effect on overall performance due to low processing performance.

Various non-competitive consensus methods in which block-level finality is guaranteed have been proposed (e.g., Tendermint, a Practical Byzantine Fault Tolerance (PBFT) consensus algorithm, etc.) in order to improve blockchain performance. Such consensus methods have message complexity proportional to the square of the number of nodes because nodes have to exchange consensus messages with each other, which causes a problem in that it is difficult to increase the number of consensus nodes. Therefore, only a limited number of nodes participate in consensus, so consensus message complexity is the major cause affecting overall performance, and the traffic cost for propagating transactions has little effect on performance.

In non-competitive consensus methods, when the number of nodes participating in consensus increases, methods of entrusting consensus to some of the nodes are used (e.g., Delegated Proof of Stake (DPoS) and the like). The DPoS method used in EOS and the like is a method of delegating authority to some nodes selected through voting and allowing only these nodes (21 nodes) to participate in consensus. This method may obtain high processing performance because only nodes to which authority is delegated participate in consensus. Also, because transactions to be processed have only to be transferred to the consensus nodes to which authority is delegated, the traffic cost for transferring the transactions may be reduced. However, in this method, nodes other than the selected consensus nodes are not able to participate in consensus, which causes a centralization problem.

A Pure Proof of Stake (PPoS) consensus method used in Algorand is a method of performing proof-of-stake using the stakes of randomly selected nodes, and has decentralized characteristics because all nodes are eligible to participate in consensus. Also, because only some nodes randomly selected from among a large number of participating nodes participate in consensus, high processing performance may be obtained. However, because any of the nodes participating in consensus is allowed to propose a new candidate block, transactions that have to be processed must be transferred to all nodes. The amount of data corresponding to consensus messages may be reduced using hash or the like, but because the transactions have to be transferred to all nodes and validated, it is necessary to optimize transfer of transactions in order to improve overall performance. That is, in a consensus method satisfying both decentralization and high processing performance, the traffic cost for transferring transactions affects overall performance.

The traffic cost for transferring transactions may exceed the message exchange cost for consensus. For example, when the average length of transactions is 250 bytes and when the performance goal is 10,000 Transactions Per Second (TPS), the bandwidth required for transferring raw transactions to each node is 2,500,000 (=250×10,000) bytes/s, which imposes a load of 20 Mbit/s on the node.

That is, when some nodes are selected and participate in consensus in the state in which a large number of nodes is present and all of the nodes receive transactions, the cost for transferring transactions may affect the overall blockchain performance. Because the same network resources have to be used both for transmission/reception of consensus messages and for transfer of transactions to be processed, a method for reducing traffic while allowing some nodes, among all nodes, to participate in consensus is required for fast consensus. However, as described above, delegation methods have a problem in which, although high performance is realized because only some nodes receive consensus messages and transactions, not all nodes are eligible to participate in consensus. Currently, there is no known technology for qualifying all nodes for participation in consensus while limiting the number of nodes that process transactions.

A paper published on Oct. 20, 2020 and titled "Algorithm based on Byzantine agreement among decentralized agents (BADA)", U.S. Pat. No. 2019-0327084, U.S. Pat. No. 2019-0379538, and U.S. Pat. No. 2020-0403776 disclose in detail a method of selecting a consensus congress based on a nonce chain and a method of generating a blockchain using the same. The technology disclosed in the above paper and patents is a method in which a node performs a coin toss once with a success probability of p and a failure probability of 1-p and a consensus node is selected depending on the result of the coin toss. Accordingly, this method enables a random consensus congress to be formed, but because transactions have to be transferred to all nodes, the cost of transferring the transactions inevitably degrades the overall blockchain performance.

Therefore, new technology in which arbitrary nodes are selected as a consensus congress for each block from among participating nodes so as to generate a new block and connect the same to a blockchain and in which only some nodes receive transactions to be processed is urgently required.

SUMMARY OF THE INVENTION

An object of the present invention is to enable nodes that are randomly selected for each block from among participating nodes to be selected as a consensus congress while enabling only some nodes to receive transactions to be processed in a blockchain.

Another object of the present invention is to improve consensus performance by reducing the number of transactions to be transferred by limiting the number of nodes to receive the transactions to be processed and to prevent a centralization problem by enabling all nodes to participate in a consensus process.

A further object of the present invention is to make only some selected nodes process transactions and to make a consensus congress randomly selected for each block from among all nodes generate a new block and connect the same to a blockchain.

Yet another object of the present invention is to enable different services to be processed in parallel in a single blockchain using multiple shares of each node, without being physically split into groups.

In order to accomplish the above objects, a method for distributed consensus, performed by an apparatus for distributed consensus, according to the present invention includes performing, by each of nodes forming a blockchain, an operation corresponding to a success probability (p) a number of times corresponding to the share value thereof; sending, by nodes having at least one share corresponding to the operation which is successful, a message for being selected as consensus nodes; and performing, by the consensus nodes, which are nodes having consensus shares selected from among the shares corresponding to the operation which is successful, distributed consensus.

Here, the nodes forming the blockchain include major shareholder nodes for processing transactions.

Here, when selected as the consensus nodes, the major shareholder nodes may send a delegate request message including transactions, and nodes other than the major shareholder nodes, among the consensus nodes, may send a delegate request message including no transactions.

Here, shares corresponding to the operation which is successful, among shares possessed by the major shareholder nodes, may have priority for being selected as the consensus shares.

Here, the major shareholder nodes have an upper limit on the number of consensus shares capable of being assigned thereto.

Here, the major shareholder nodes may be selected from among the nodes in descending order of shares possessed thereby.

Here, the major shareholder nodes may be selected until the cumulative number of shares of nodes selected as the major shareholder nodes becomes equal to or greater than a preset proportion of all shares or until the number of nodes selected as the major shareholder nodes becomes equal to or greater than a preset number.

Here, the operation may compare a random value generated using a nonce chain of a node performing the operation with a threshold corresponding to the success probability.

Here, the nodes may have at least one additional share value along with the share value and process different kinds of services in parallel based on the share value and the additional share value.

Here, the operation may perform comparison of a threshold corresponding to the success probability using a nonce chain of a node performing the operation, and a nonce value corresponding to the nonce chain may be shared between the share value and the additional share value.

Also, an apparatus for distributed consensus according to an embodiment of the present invention includes one or more processors; and executable memory for storing at least one program executed by the one or more processors.

Here, the at least one program may perform an operation corresponding to a success probability (p) a number of times corresponding to the share value of each of nodes forming a blockchain, send a message for selecting nodes having at least one share corresponding to the operation which is successful as consensus nodes, and perform distributed consensus by using nodes having consensus shares, selected from among the shares corresponding to the operation which is successful, as the consensus nodes. Here, the nodes forming the blockchain may include major shareholder nodes for processing transactions.

Here, when selected as the consensus nodes, the major shareholder nodes may send a delegate request message including transactions, and nodes other than the major shareholder nodes, among the consensus nodes, may send a delegate request message including no transactions.

Here, shares corresponding to the operation which is successful, among shares possessed by the major shareholder nodes, may have priority for being selected as the consensus shares.

Here, the major shareholder nodes have an upper limit on the number of consensus shares capable of being assigned thereto.

Here, the major shareholder nodes may be selected from among the nodes in descending order of shares possessed thereby.

Also, a method for generating a blockchain according to an embodiment of the present invention includes receiving, by a chair node, which is one of consensus nodes that are selected in order to connect an additional block to a blockchain, delegate request messages, including transactions that have to be processed after a previous block connected to the blockchain is agreed upon, from major shareholder nodes, among the consensus nodes; receiving, by the chair node, delegate request messages including no transactions from remaining nodes, excluding the major shareholder nodes, among the consensus nodes; performing, by the chair node, share-based verification using the delegate request messages including the transactions and the delegate request messages including no transactions; sending, by the chair node, a prepare message to quorum nodes when the share-based verification succeeds; receiving commit messages from the quorum nodes; and connecting the additional block to the blockchain based on the commit messages.

Here, the share-based verification may include checking whether the sum of successful shares corresponding to the delegate request messages including the transactions and the delegate request messages including no transactions is greater than a quorum size (2f+1). Here, the prepare message may include transactions for which the sum of successful shares is verified using a reference natural number (f+1), which corresponds to half the result of adding 1 to the quorum size (2f+1).

Here, the consensus nodes may be selected based on an operation corresponding to a success probability (p), which is performed a number of times corresponding to the share value of each of nodes forming the blockchain.

Here, the consensus nodes may be nodes having consensus shares selected from among shares corresponding to the operation which is successful.

Here, the major shareholder nodes may have an upper limit on the number of consensus shares capable of being assigned thereto.

Here, the major shareholder nodes may be selected from among the nodes in descending order of shares possessed thereby.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

The advantages and features of the present invention and methods of achieving the same will be apparent from the exemplary embodiments to be described below in more detail with reference to the accompanying drawings. However, it should be noted that the present invention is not limited to the following exemplary embodiments, and may be implemented in various forms. Accordingly, the exemplary embodiments are provided only to disclose the present invention and to let those skilled in the art know the category of the present invention, and the present invention is to be defined based only on the claims. The same reference numerals or the same reference designators denote the same elements throughout the specification.

It will be understood that, although the terms "first," "second," etc. may be used herein to describe various elements, these elements are not intended to be limited by these terms. These terms are only used to distinguish one element from another element. For example, a first element discussed below could be referred to as a second element without departing from the technical spirit of the present invention.

The terms used herein are for the purpose of describing particular embodiments only, and are not intended to limit the present invention. As used herein, the singular forms are intended to include the plural forms as well, unless the context clearly indicates otherwise. It will be further understood that the terms "comprises," "comprising,", "includes" and/or "including," when used herein, specify the presence of stated components or steps, but do not preclude the presence or addition of one or more other components or steps.

Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

Generally, when the number of participating nodes increases in a blockchain using non-competitive consensus, consensus message complexity is increased, whereby performance is degraded. In this case, performance may be improved by reducing the number of nodes directly participating in consensus by selecting some of the nodes as a consensus congress. However, when only some fixed nodes are used as a consensus congress, a centralization problem may be caused again. Accordingly, technology for randomly reconfiguring a consensus congress for each block is required.

Also, the randomly selected consensus nodes may improve performance using a consensus algorithm having message complexity of O(N). Here, because all nodes have the possibility of being selected as consensus nodes, the traffic cost for transferring transactions to be processed to all participating nodes increases in proportion to the number of nodes, which may degrade performance. Accordingly, a method for reducing the amount of data over the entire network is required. For example, there is research for reducing the amount of data through optimization using a gossip protocol or the like, but because it is impossible to predict the nodes to be selected as a consensus congress when the consensus congress is randomly selected, the number of transactions transferred to the respective nodes cannot be reduced.

In the above-mentioned paper titled "Algorithm based on Byzantine agreement among decentralized agents (BADA)", U.S. Pat. No. 2019-0379538, and the like, a method for performing Byzantine fault-tolerant consensus by a randomly selected consensus congress is disclosed.

According to this consensus algorithm, p (which is a success probability) and f (which is a Byzantine size and an integer equal to or greater than 1) that satisfy both Equation (1) and Equation (2) below may be calculated, and 3f+1 may be set as the size of a consensus congress. Here, n is the number of all participating nodes, and b is the number of Byzantine nodes, and is set to n×$b_p$ when the proportion of Byzantine nodes included in all of the nodes is $b_p$.

Equation (1) below means that, when each of b Byzantine nodes performs a coin toss with a success probability of p and a failure probability of 1-p, the probability of the number of Byzantine nodes that win the coin toss exceeding f is equal to or less than $P_{max\_bzt}$. Also, Equation (2) below means that, when a total of n nodes perform a coin toss with a success probability of p and a failure probability of 1-p, the probability that the number of nodes that win the coin toss is equal to or less than 3f is equal to or less than $P_{min\_node}$.

$$1 - \sum_{k=0}^{f} \binom{b}{k} p^k (1-p)^{(b-k)} \leq P_{max\_bzt} \qquad (1)$$

$$\sum_{x=0}^{3f} \binom{n}{x} p^x (1-p)^{(n-x)} \leq P_{min\_node} \qquad (2)$$

According to the consensus algorithm introduced in the above-mentioned paper and the like, when a total of n nodes perform a coin toss with a success probability of p satisfying the conditions of the above two equations, and when the number of nodes that win the coin toss is equal to or greater than 3f+1, a consensus congress is formed by randomly selecting 3f+1 nodes. In this case, because the nodes that win the coin toss are not known in advance, all nodes have the possibility of being selected as a consensus congress, so transactions to be processed have to be transferred to all of the nodes. This is a problem not only in the consensus algorithm introduced in the above-mentioned paper but also in all consensus algorithms in which a consensus congress is formed by randomly selecting nodes and only the nodes belonging to the formed consensus congress participate in consensus.

According to an embodiment of the present invention, Byzantine fault-tolerant distributed consensus is performed based on the proportion of shares of nodes in distributed consensus in blockchain. Particularly, according to an embodiment of the present invention, only some selected nodes process transactions, and a consensus congress randomly selected for each block from among all nodes may generate a new block and connect the same to a blockchain.

According to an embodiment of the present invention, not the number of all nodes but the sum of shares issued to all nodes may be used as n in the above two equations, and not the number of Byzantine nodes (the maximum number of Byzantine nodes) but shares possessed by the Byzantine nodes (the maximum Byzantine shares included in all of the shares) may be used as b in the above two equations.

Because not nodes but shares are applied to the above equations, some nodes (the major shareholder nodes to be described later) process transactions, and all nodes are eligible to participate in consensus. Accordingly, distributed consensus is performed by forming a random consensus congress, and a block that is agreed upon may be connected to a blockchain.

When a consensus congress is formed using Equations (1) and (2) above based on the number of nodes, all nodes having the possibility of constituting a consensus congress have to receive transactions, whereby performance degradation resulting from the load imposed due to transaction processing may be caused.

According to an embodiment of the present invention, the nodes to process transactions are selected, consensus nodes are selected using these nodes, and distributed consensus is performed by the consensus nodes, whereby a new block may be connected to a blockchain.

First, nodes for processing transactions may be selected as follows.

Nodes forming a blockchain are sorted in descending order of the share value (share size) possessed thereby, and nodes may be sequentially selected as major shareholder nodes starting with the node having the largest share value. Here, the major shareholder nodes may be nodes having shares, the sum of which is equal to or greater than a preset value. Here, the major shareholder nodes may be selected until the cumulative number of shares of the nodes selected as major shareholder nodes becomes equal to or greater than a certain proportion of all shares, or a predefined number of major shareholder nodes may be selected from the nodes having the largest share values.

In order to selectively process transactions, only the major shareholder nodes selected as described above are able to receive transactions to be processed. Here, the remaining nodes, excluding the major shareholder nodes, may serve merely to mediate transactions.

As described above, when major shareholder nodes for processing transactions are separately selected from among all nodes, only the major shareholder nodes, among all consensus nodes participating in distributed consensus, receive the transaction to be processed. Accordingly, the cost of traffic over the entire network may be reduced. Here, when a consensus congress is formed, the major shareholder nodes may use the transactions assigned thereto for distributed consensus.

Figure 1:
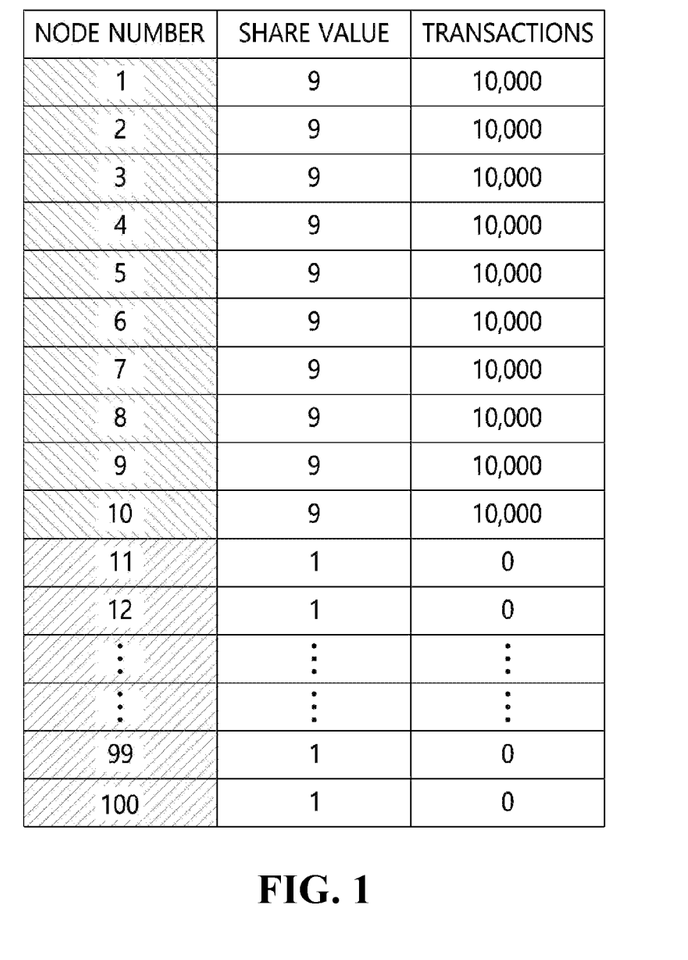
FIG. 1 is a table illustrating the state of shares possessed by nodes, including major shareholder nodes, and transaction processing according to an embodiment of the present invention.

FIG. 1 is a table illustrating the state of shares possessed by nodes, including major shareholder nodes, and transaction processing according to an embodiment of the present invention.

Referring to FIG. 1, it can be seen that the total number of nodes is 100, the total number of issued shares is 180, and the cumulative number of shares possessed by 10 top nodes is 90, which accounts for 50% of all of the shares.

Here, node 1, node 2, node 3, node 4, node 5, node 6, node 7, node 8, node 9, and node 10, which possess 50% of all of the shares, may be selected as major shareholder nodes. Here, only node 1, node 2, node 3, node 4, node 5, node 6, node 7, node 8, node 9, and node 10, which are the nodes selected as major shareholder nodes, may receive transactions to be processed, and the remaining nodes, namely node 11, node 12, . . . , node 99, and node 100, may serve merely to mediate transactions.

Hereinafter, a method for selecting consensus nodes for distributed consensus according to an embodiment of the present invention will be described.

Basically, selecting consensus nodes according to an embodiment of the present invention is performed by applying Equations (1) and (2) above based on shares.

When the sum of shares possessed by all participating nodes is n and when a Byzantine proportion is $b_p$, the maximum Byzantine shares are b (=n×$b_p$), and p and f that satisfy both Equation (1) and Equation (2) above may be calculated.

That is, each of nodes forming a blockchain repeatedly performs a coin toss with a success probability of p a number of times equal to the share value thereof. After the results of all of the nodes are collected, when the sum of the shares corresponding to the success is equal to or greater than 3f+1, arbitrary nodes that possess 3f+1 shares are selected as consensus nodes (a consensus congress). Here, in order to prevent a specific node from having an excessive number of consensus shares (shares corresponding to the success in the coin toss), a method of admitting only shares up to an upper limit, among participatory shares, as valid shares may be applied.

Assuming that $b_p$, which is the tolerated Byzantine ratio, is 20% and that $P_{min\_node}=1.0e^{-6}$ and $P_{max\_bzt}=2.0e^{-16}$ are satisfied, because n, which is the total number of shares possessed by 100 nodes, is 180 in the example of FIG. 1, f and p satisfying both Equation (1) and Equation (2) are 36 and 0.7666666666666667, respectively.

Table 1 below shows, when the Byzantine ratio, $b_p$, is 20% and $P_{min\_node}=1.0e^{-6}$ and $P_{max\_bzt}=2.0e^{-16}$ are satisfied, the result of comparing the case in which f satisfying Equations (1) and (2) above is calculated based on shares according to an embodiment of the present invention with the case in which f and p satisfying Equations (1) and (2) above are calculated based on nodes according to the distributed consensus algorithm disclosed in the above-mentioned paper "Algorithm based on Byzantine agreement among decentralized agents (BADA)", U.S. Pat. No. 2019-0327084, U.S. Patent No. 2019-0379538, and U.S. Pat. No. 2020-0403776.

TABLE 1

|  | n | 3f + 1 | 2f + 1 | f | p |
|---|---|---|---|---|---|
| NODE-BASED | 100 | 61 | 41 | 20 | 0.86 |
| SHARE-BASED | 180 | 109 | 73 | 36 | 0.767 |

In Table 1 above, in the case of the node-based method, n is the number of all nodes, 3f+1 is the number of consensus nodes corresponding to a consensus congress, 2f+1 is the number of quorum nodes corresponding to a consensus quorum, and f is the number of Byzantine nodes corresponding to the probability $P_{max\_bzt}$.

In Table 1 above, in the case of the share-based method, n is the total number of shares possessed by all nodes, 3f+1 is the number of consensus shares corresponding to a consensus congress, 2f+1 is the number of quorum shares corresponding to a consensus quorum, and f is the number of Byzantine shares corresponding to the probability $P_{max\_bzt}$.

That is, when a participating node repeatedly performs a coin toss with a success probability of p as many times as the share value possessed thereby, the total number of shares corresponding to the success follows a binomial distribution, and all of the nodes that win the coin toss one or more times become consensus candidate nodes. In other words, all of the nodes having a successful share become consensus candidate nodes.

In the example of Table 1, when the total number of shares, n, and the success probability, p, satisfying the conditions are considered, an average of about 138 shares (=n×p=180×0.767) corresponds to success in the coin toss. Accordingly, among the 138 successful shares, nodes having 109 (3f+1) successful shares (consensus shares) may be selected as consensus nodes corresponding to a consensus congress.

When 109 consensus shares are selected, if the successful shares of the major shareholder nodes are preferentially selected, an average of about 69 (=90×0.767) successful shares of the major shareholder nodes will be selected as consensus shares. Then, the 40 remaining consensus shares are randomly selected from among the successful shares of nodes from node 11 to node 100. The actually selected shares are determined depending on a probability distribution, but this example simply takes the average value in order to describe the concept.

If the selected 69 successful shares of the major shareholder nodes are distributed across the 10 major shareholder nodes of FIG. 1, the total number of consensus nodes having the consensus shares becomes 50 by adding the 10 major shareholder nodes and the remaining 40 nodes (because the remaining 40 nodes each have a share value of 1). This means that distributed consensus is possible with a smaller number of consensus nodes, compared to the case in which, when a consensus congress is selected based on nodes, 61 consensus nodes are required when 100 nodes participate, as shown in Table 1 above.

Also, in the distributed consensus algorithm of existing delegation methods, such as DPoS and the like, only nodes to which agreement authority is delegated (bp nodes in the case of EOS) participate in consensus, and the remaining nodes are not able to participate in the consensus. In contrast, in the consensus algorithm according to an embodiment of the present invention, because only 10 consensus nodes, among a total of 50 consensus nodes, are selected from major shareholder nodes, other nodes having one or more shares still have the possibility of participating in consensus. Accordingly, the consensus algorithm according to an embodiment of the present invention enables all nodes to be eligible to participate in consensus while separately arranging nodes for processing transactions, thereby maintaining decentralization.

Figure 2:
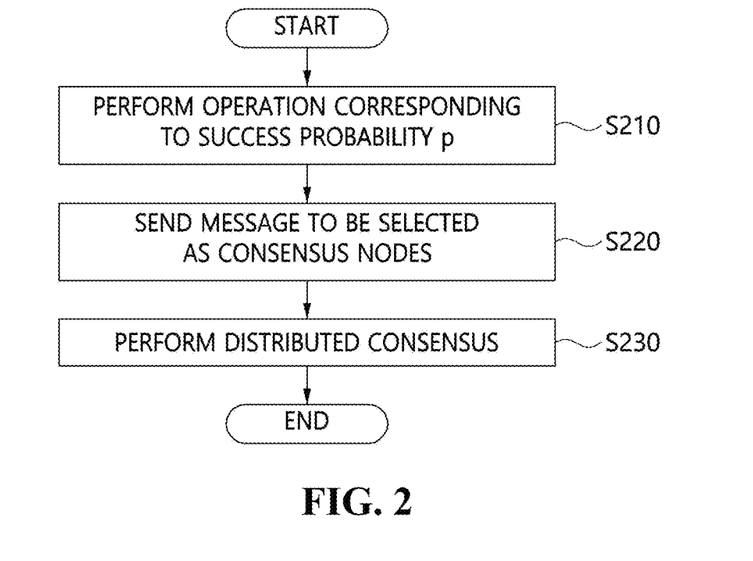
FIG. 2 is a flowchart illustrating a distributed consensus method according to an embodiment of the present invention.

FIG. 2 is a flowchart illustrating a distributed consensus method according to an embodiment of the present invention.

Referring to FIG. 2, in the distributed consensus method according to an embodiment of the present invention, each of nodes forming a blockchain performs an operation corresponding to a success probability of p a number of times corresponding to the share value thereof at step S210.

Here, the nodes forming the blockchain may include major shareholder nodes for processing transactions.

Here, the operation may be configured to compare a random value generated using the nonce chain of the node performing the operation with a threshold corresponding to the success probability.

Also, in the distributed consensus method according to an embodiment of the present invention, nodes having at least one share corresponding to the operation which is successful send messages for being selected as consensus nodes at step S220.

Also, in the distributed consensus method according to an embodiment of the present invention, nodes having consensus shares, which are selected from among the shares corresponding to the operation which is successful, perform distributed consensus as consensus nodes at step S230.

Here, shares corresponding to the operation which is successful, among the shares possessed by the major shareholder nodes, may have priority for being selected as consensus shares.

Here, the major shareholder nodes may have an upper limit on the number of consensus shares capable of being assigned thereto.

Here, the major shareholder nodes may be selected from among the nodes in descending order of shares possessed by the nodes.

Here, the major shareholder nodes may be selected until the cumulative number of shares of the nodes selected as the major shareholder nodes becomes equal to or greater than a preset proportion of all of the shares or until the number of nodes selected as major shareholder nodes becomes equal to or greater than a preset number.

Here, when selected as consensus nodes, the major shareholder nodes may send delegate request messages including transactions, and nodes, other than the major shareholder nodes, among the consensus nodes, may send delegate request messages not including any transactions.

Here, the nodes forming the blockchain have at least one additional share value along with the share value, and may process different kinds of services in parallel based on the share value and the additional share value.

Here, a nonce value corresponding to the nonce chain may be shared between the share value and the additional share value. When the nonce value is shared, if a hash related to the share of the previous block is used, a coin toss for two or more share values becomes possible.

Figure 3:
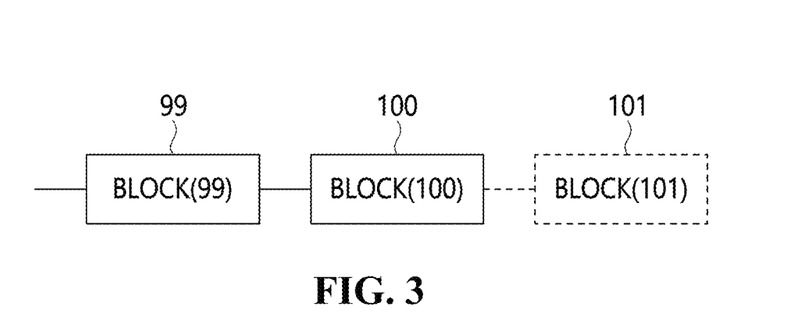
FIG. 3 is a block diagram illustrating an example in which a new block is agreed upon and added to a blockchain using a blockchain generation method according to an embodiment of the present invention.

FIG. 3 is a block diagram illustrating an example in which a new block is agreed upon and added to a blockchain using a method for generating a blockchain according to an embodiment of the present invention.

Referring to FIG. 3, it can be seen that, in the state in which the current block (block 100) is agreed upon and connected to a blockchain, when distributed consensus for block 101 is performed and succeeds, block 101 is connected to the blockchain.

Here, in the process for agreement on block 100, the results of a coin toss performed by nodes (that is, performed by each node a number of times equal to the share value thereof) are collected in order to decide on a consensus congress for block 101, and 50 nodes having 109 successful shares may be selected as a consensus congress (consensus nodes), as in the above-described example.

Figure 4:
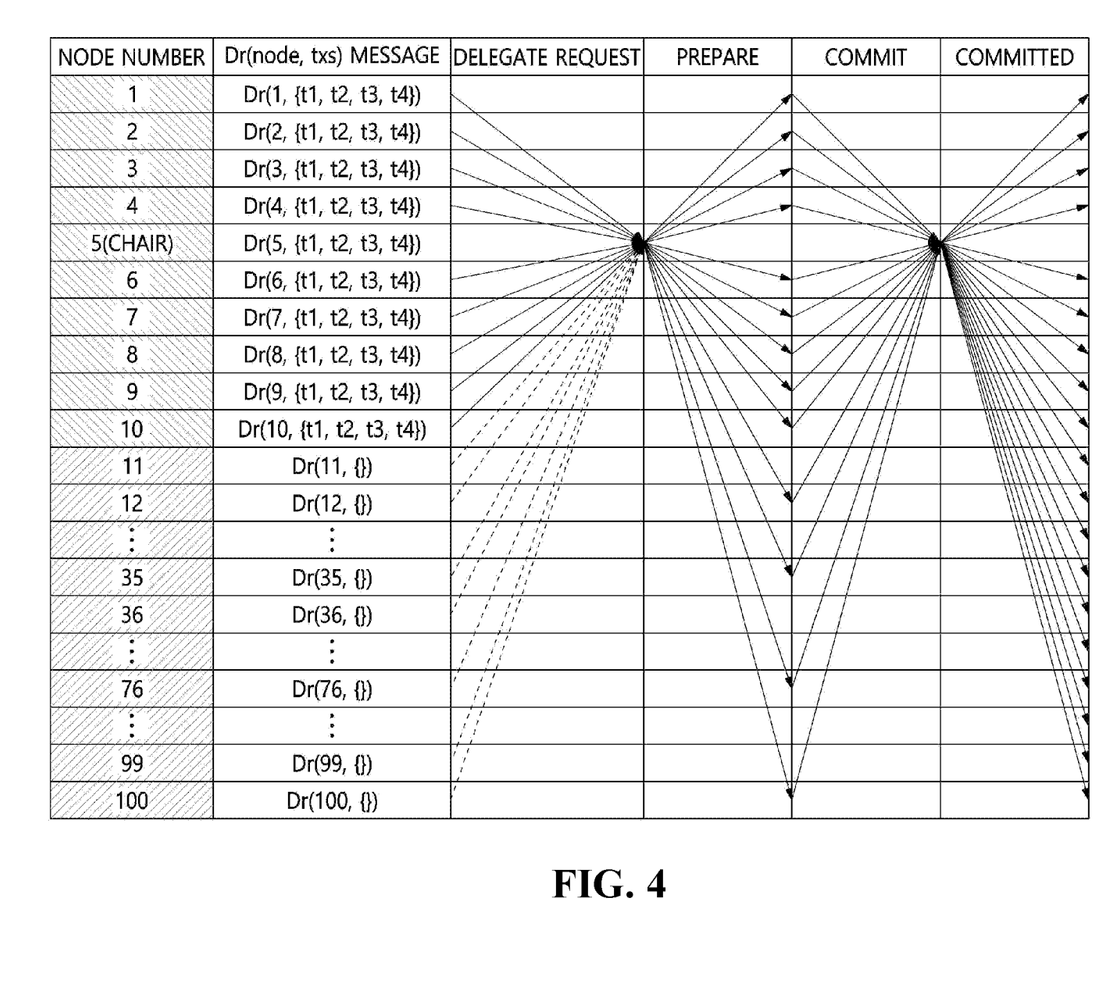
FIG. 4 is a table illustrating a blockchain generation method according to an embodiment of the present invention.

FIG. 4 is a table illustrating a method for generating a blockchain according to an embodiment of the present invention.

Referring to FIG. 4, it can be seen that, among consensus nodes, node 5 is a chair node for block 101 in the method for generating a blockchain according to an embodiment of the present invention.

The example of FIG. 4 corresponds to an embodiment of the present invention described with reference to FIGS. 1 to 3, and consensus nodes are 50 nodes having 109 successful shares and include major shareholder nodes, which are nodes from node 1 to node 10. Although not explicitly illustrated in FIG. 4, the consensus nodes include 40 nodes selected from among nodes from node 11 to node 100, other than the 10 major shareholder nodes.

In the example of FIG. 4, it is assumed that, when a consensus congress is formed, the successful shares of the nodes are disclosed.

After block 100 is agreed upon, transactions t1, t2, t3, and t4, which have not yet been processed, are transferred to the respective major shareholder nodes, whereby nodes from node 1 to node 10 are assigned the transactions t1, t2, t3 and t4.

At the delegate request stage for block 101, each of the consensus nodes sends a message, containing the transactions received thereby, to the chair node. Here, the format of the message may be Dr(node, {txs}), and additional information, such as a digital signature and the like, may be included in the message for integrity thereof Hereinafter, only essential data, excluding the additional information, will be briefly described for convenience of description.

Nodes from node 1 to node 10, which are major shareholder nodes, among the consensus nodes, send Dr(node, {t1, t2, t3, t4}) messages, including the transactions {t1, t2, t3, t4}, to the chair node, as shown in FIG. 4. Here, 40 consensus nodes selected from among nodes from node 11 to node 100 have no transactions, and therefore send a message such as Dr(node, { }) to node 5, which is a chair node.

At the delegate request stage, when the sum of the successful shares of the nodes sending the delegate request messages (Dr( ) messages) is greater than 73 (2f+1), which is a quorum size, and when the sum of the successful shares corresponding to Dr( ) messages received from nodes from node 1 to node 10 is equal to or greater than 37 (f+1), node 5, which is a chair node, generates a prepare message, transfers the same to quorum nodes, and changes the state thereof to 'Prepare'. In the example of FIG. 4, the quorum nodes are a total of 14 nodes including the chair node (node 1, node 2, node 3, node 4, node 5, node 6, node 7, node 8, node 9, node 10, node 12, node 35, node 76, and node 100).

The prepare message generated by the chair node may include transactions, processing of which is requested by the nodes having 37 (f+1) or more successful shares, among the transactions {t1, t2, t3, t4} included in each of the received delegate request messages, along with additional information. Here, the additional information may be proof corresponding to the included transactions, data for a multisignature, or the like. Consensus technology using multisignature has been described in detail in the above-mentioned paper and patents.

As described above, when the major shareholder nodes, among the consensus nodes, repeatedly perform a coin toss a number of times equal to the respective share values thereof, the average number of times the coin toss is won is 69. As described above, because f is 36, a prepare message including transactions agreed upon by 37 successful shares (53.62%) will be generated by the chair node. In the example described with reference to FIG. 4, because the number of successful shares possessed by 10 nodes from node 1 to node 10, which made a request to process the transactions {t1, t2, t3, t4}, is 69 and because this value is equal to or greater than 37 (f+1), a prepare message, including the transactions t1, t2, t3, and t4 and proof for the successful shares of the nodes that made a request to process the respective transactions, is generated and sent to the quorum nodes.

For the performance of 10,000 Transactions Per Second (TPS), the transaction data load imposed on each node is 20 Mbit/s. Accordingly, nodes from node 1 to node 10 have to receive 10,000 transactions per second, check whether there is any abnormality therein, generate a Dr(node, {10,000 txs}) message including 10,000 transactions, and send the same to the chair node. In this case, the volume of traffic for transferring raw transactions from nine nodes, excluding the chair node, to the chair node is 180 Mbit/s. Here, if a transaction hash is used, the network cost may be reduced.

Because the 40 consensus nodes selected from among nodes from node 11 to node 100 neither receive nor store transactions, they transfer Dr(node,{ }) messages containing an empty transaction to the chair node. Accordingly, the network cost for transferring transactions is zero.

Furthermore, because the Dr(node, { }) messages received from the 40 nodes include no transactions, the computing load for processing transactions is reduced in the chair node.

In the case of the consensus algorithm introduced in the above-mentioned paper and patents, among 61 consensus nodes, 60 nodes, excluding the chair node, have to respectively send Dr(node, {10,000 txs}) messages, each containing 10,000 transactions, to the chair node, as shown in Table 1 above, in which case the traffic the chair node has to receive is 60×20 Mbit/s=1,200 Mbits/s, so it is impossible to process the same even with the network bandwidth of 1 Gb. Even if there is no limit on the network bandwidth, because all of the 60 messages include transactions, the chair node has no choice but to consume computing resources in order to process the same.

In the example of FIG. 4, the quorum nodes are 14 nodes (node 1, node 2, node 3, node 4, node 5, node 6, node 7, node 8, node 9, node 10, node 12, node 35, node 76, and node 100), which have 73 (2f+1) successful shares. In the case of the node-based method, 41 nodes have to constitute the quorum nodes, as shown in Table 1, but according to the present invention, the number of quorum nodes is decreased from 41 to 14, which has an effect of reducing the amount of computing resources and network resources required for the consensus process. Table 2 below shows the difference in the number of nodes between the node-based consensus algorithm and the share-based consensus algorithm.

TABLE 2

|  | TOTAL NODES | CONSENSUS NODES | QUORUM NODES |
| --- | --- | --- | --- |
| NODE-BASED | 100 | 61 | 41 |
| SHARE-BASED | 100 | 50 | 14 |

Referring again to FIG. 4, among the consensus nodes, the quorum nodes receiving the prepare message change the states thereof to a prepare stage. Only the quorum nodes, the node state of which is a prepare stage, are able to generate a commit message. The quorum nodes, the node state of which is a prepare stage, check whether or not the received prepare message is normal, generate a commit message including the signature thereof when there is no abnormality, transfer the same to the chair node, and change the state thereof to 'commit'.

When the chair node in the 'prepare' state receives the commit messages from all of the quorum nodes, excluding the chair node itself, the chair node generates a committed block, including the transactions t1, t2, t3, and t4, which are finally agreed upon, and a multi-signature acquired by aggregating the signatures of the nodes, and adds the committed block as block 101 subsequent to block 100 in the blockchain thereof. Simultaneously therewith, the chair node propagates the block (block 101) that is agreed upon to all of the nodes and changes the state thereof to a committed state.

Also, all of the nodes that are not in the committed state for block 101 receive the committed block, check whether the multi-signature of the block is valid, add block 101 subsequent to block 100 of the blockchain thereof only when the multi-signature is valid, and change the state thereof to a committed state. All of the nodes that are in the committed state for block 101 become ready to agree on block 102.

Figure 5:
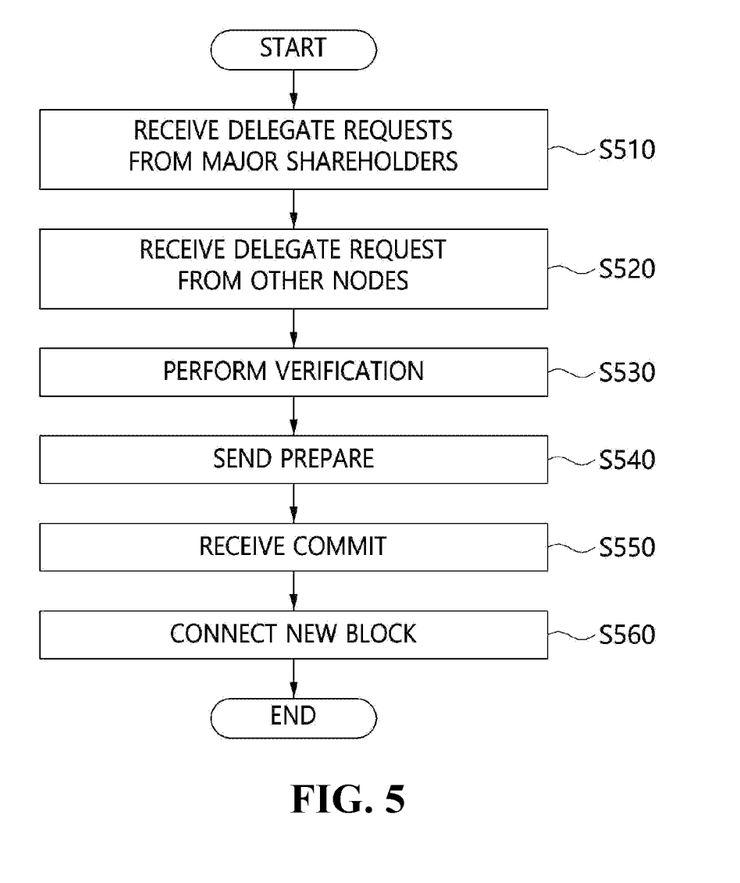
FIG. 5 is a flowchart illustrating a blockchain generation method according to an embodiment of the present invention.

FIG. 5 is a flowchart illustrating a method for generating a blockchain according to an embodiment of the present invention.

Referring to FIG. 5, in the method for generating a blockchain according to an embodiment of the present invention, a chair node, which is one of consensus nodes that are selected in order to connect an additional block to a blockchain, receives delegate request messages, including transactions that have to be processed after the previous block connected to the blockchain is agreed upon, from major shareholder nodes, among the consensus nodes, at step S510.

Here, the consensus nodes may be selected based on an operation corresponding to a success probability of p that is performed as many times as the share value of each of nodes forming the blockchain.

Here, the consensus nodes may be nodes having consensus shares that are selected from among shares corresponding to the operation which is successful.

Here, the major shareholder nodes may be selected from among the nodes in descending order of shares possessed thereby.

Here, the major shareholder nodes may have an upper limit on the number of consensus shares capable of being assigned thereto.

Also, in the method for generating a blockchain according to an embodiment of the present invention, the chair node receives delegate request messages including no transactions from the remaining nodes, excluding the major shareholder nodes, among the consensus nodes, at step S520.

Here, steps S510 and S520 may be performed according to the order in which the consensus nodes for sending the delegate request messages send the delegate request messages, rather than being sequentially performed in the order illustrated in FIG. 5. That is, steps S510 and 520 may be performed in the order illustrated in FIG. 5, in the reverse order, or at the same time.

Also, in the method for generating a blockchain according to an embodiment of the present invention, the chair node performs share-based verification using the delegate request messages including the transactions and the delegate request messages including no transactions at step S530.

Here, share-based verification may include checking whether the sum of successful shares corresponding to the delegate request messages including the transactions and the delegate request messages including no transactions is greater than a quorum size (2f+1). Here, a prepare message may include transactions for which the sum of successful shares is verified using a reference natural number (f+1), which corresponds to half the result of adding 1 to the quorum size.

When share-based verification succeeds, the chair node sends the prepare message to quorum nodes at step S540.

Also, in the method for generating a blockchain according to an embodiment of the present invention, the chair node receives commit messages from the quorum nodes at step S550.

Also, in the method for generating a blockchain according to an embodiment of the present invention, the chair node connects the additional block to the blockchain based on the commit messages at step S560.

Figure 6:
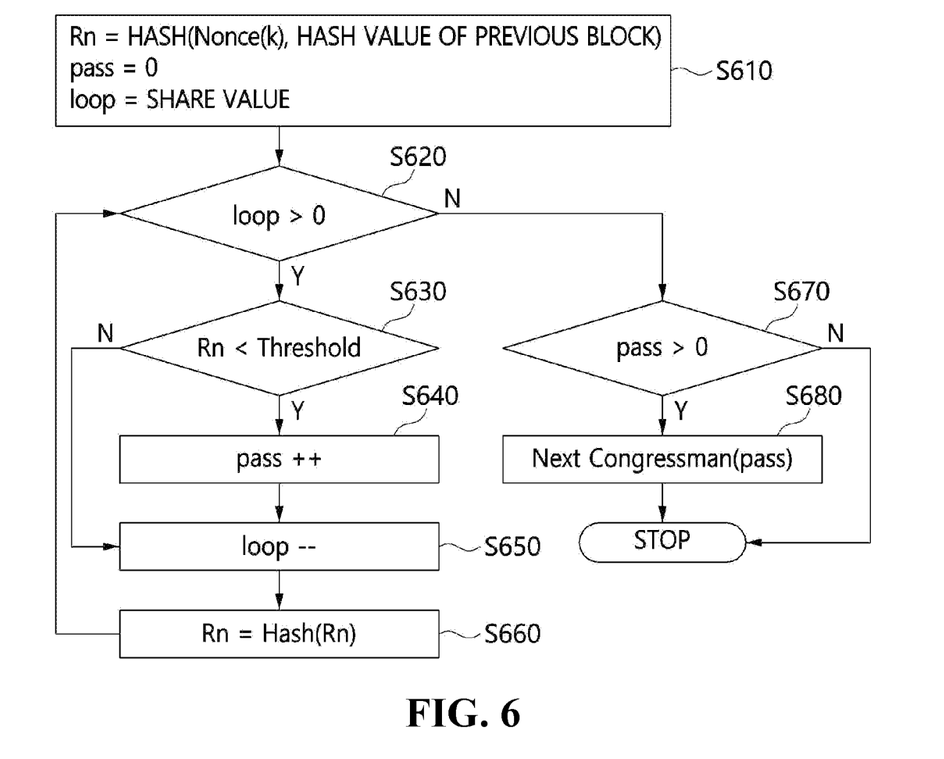
FIG. 6 is a flowchart illustrating a process in which each of nodes forming a blockchain performs an operation corresponding to a success probability a number of times corresponding to the share value thereof according to an embodiment of the present invention.

FIG. 6 is a flowchart illustrating a process in which each of nodes forming a blockchain performs an operation corresponding to a success probability a number of times equal to the share value thereof according to an embodiment of the present invention.

FIG. 6 illustrates technology in which each node is able to repeat a coin toss a number of times equal to the share value possessed thereby based on technology in which each node performs a coin toss once using a Verifiable Random Function (VRF) or a nonce chain described in the above-mentioned paper and patents.

Referring to FIG. 6, it can be seen that a random value Rn is generated first and variables 'pass' and 'loop' are initialized at step S610.

In the example illustrated in FIG. 6, 'Rn=Hash(Nonce(k), HASH VALUE OF PREVIOUS BLOCK)' is a process of generating a random value using a nonce chain, as described in detail in the above-mentioned paper and patents. Here, 'HASH VALUE OF PREVIOUS BLOCK' may be the header hash of the previous block. Also, 'loop=SHARE VALUE' indicates that the variable 'loop' is initialized to the share value of each node. The variable 'pass' is initialized to 0.

Whether the variable 'loop' is greater than 0 is determined at step S620.

When it is determined at step S620 that 'loop' is greater than 0, this indicates that there is a share with which a coin toss is capable of being performed, so the process goes to step S630, whereby an operation corresponding to the coin toss is performed at step S630.

Here, at step S630, whether the random value Rn is less than a threshold may be determined. The threshold is a value corresponding to p, which is set based on Equations (1) and (2) above, and may be calculated using p. For example, when the operation is performed on 32 bits, the product of p and a 32-bit value, all bits of which are 1, may be used as the threshold.

When it is determined at step S630 that Rn is less than the threshold, this is considered success in the coin toss, and the process goes to step S640, whereby the variable 'pass' is increased by 1.

Then, the variable 'loop' is decreased by 1 at step S650.

When it is determined at step S630 that Rn is not less than the threshold, this is considered failure in the coin toss, so the process goes to step S650 without increasing the variable 'pass'.

Then, the current value of Rn is hashed, whereby the random value Rn is updated at step S660.

After the random value is updated, step S620 is performed again.

When it is determined at step S620 that 'loop' is not greater than 0, step S670 is performed, whereby whether the variable 'pass' is greater than 0 is checked.

When it is determined at step S670 that the variable 'pass' is greater than 0, a 'Next Congressman' message is output, whereby the node announces that the node itself is eligible to become a consensus congress candidate for the next block at step S680.

Here, because the 'Next Congressman' message includes the calculated value of 'pass', the nodes receiving the 'Next Congressman' message are made aware of the number of times the node sending the 'Next Congressman' message won the coin toss.

When it is determined at step S670 that the variable 'pass' is not greater than 0, the operation is terminated.

Other nodes receiving the 'Next Congressman' message may check whether there is any abnormality by again performing the steps illustrated in FIG. 6.

Figure 7:
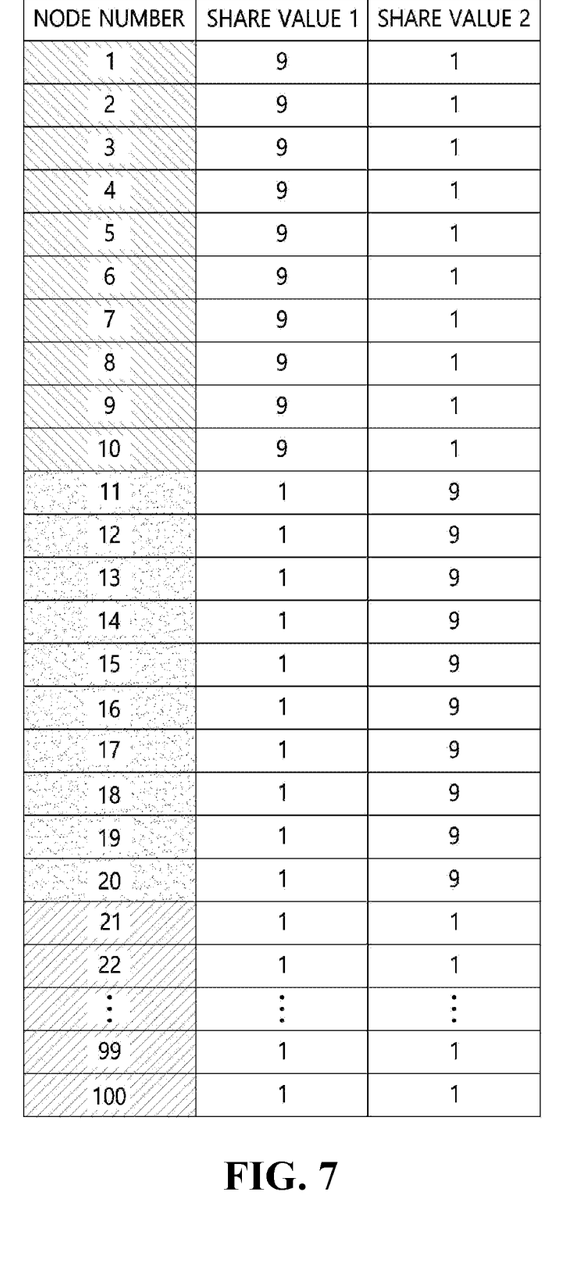
FIG. 7 is a table illustrating an example of the case in which nodes forming a blockchain have different types of share values according to an embodiment of the present invention.

FIG. 7 is a table illustrating an example of the case in which nodes forming a blockchain have different types of share values according to an embodiment of the present invention.

Referring to FIG. 7, it can be seen that each node has multiple different share values (share value 1 and share value 2).

As such, when each of participating nodes includes multiple different share values, the participating nodes may process two or more different agreements in parallel.

With regard to share value 1, consensus may be performed whereby nodes from node 1 to node 10 constitute major shareholder nodes, and with regard to share value 2, consensus may be performed whereby nodes from node 11 to node 20 constitute major shareholder nodes. Accordingly, the share values (share value 1 and share value 2) may be used to respectively connect new blocks to different blockchains.

When multiple share values are used as described above, even when there is a large number of nodes, different services may be processed without requiring splitting into shards.

When multiple share values are used, if provable random values are separately generated for the respective share values, management and operation may become difficult. In this case, when Rn in FIG. 6 is generated for each share value, if each node generates only one nonce(k) and uses different share-related hash values of the previous block for the respective share values possessed thereby, a coin toss for two or more share values may be performed using only a single nonce(k).

Figure 8:
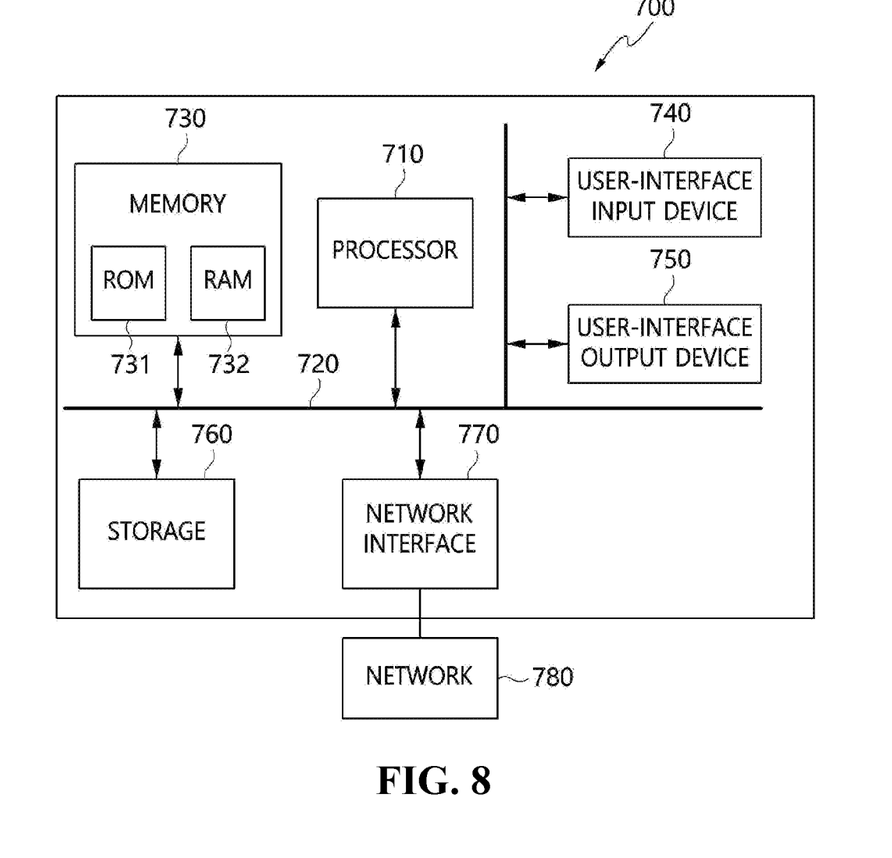
FIG. 8 is a block diagram illustrating a computer system configuration according to an embodiment of the present invention.

FIG. 8 is a block diagram illustrating a computer system configuration according to an embodiment of the present invention.

The distributed consensus apparatus, the blockchain generation apparatus, and the nodes forming a blockchain according to an embodiment may be implemented in a computer system 700 including a computer-readable recording medium.

The computer system 700 may include one or more processors 710, memory 730, a user-interface input device 740, a user-interface output device 750, and storage 760, which communicate with each other via a bus 720. Also, the computer system 700 may further include a network interface 770 connected to a network 780. The processor 710 may be a central processing unit or a semiconductor device for executing a program or processing instructions stored in the memory 730 or the storage 760. The memory 730 and the storage 760 may be storage media including at least one of a volatile medium, a nonvolatile medium, a detachable medium, a non-detachable medium, a communication medium, or an information delivery medium, or a combination thereof. For example, the memory 730 may include ROM 731 or RAM 732.

Here, at least one program may be recorded in the memory 730.

Here, the processor 710 may execute the program. Here, the program may perform an operation corresponding to a success probability (p) a number of times corresponding to the share value of each of the nodes forming a blockchain, send a message for selecting nodes having at least one share corresponding to the operation which is successful as consensus nodes, and perform distributed consensus by using the nodes having consensus shares, selected from among the shares corresponding to the operation which is successful, as the consensus nodes.

Here, the nodes forming the blockchain may include major shareholder nodes for transaction processing.

Here, when selected as the consensus nodes, the major shareholder nodes may send a delegate request message including transactions, and nodes other than the major shareholder nodes, among the consensus nodes, may send a delegate request message including no transactions.

Here, the shares corresponding to the operation which is successful, among the shares possessed by the major shareholder nodes, may have priority for being selected as consensus shares.

Here, the major shareholder nodes may have an upper limit on the number of consensus shares capable of being assigned thereto.

Here, the major shareholder nodes may be selected from among the nodes in descending order of shares possessed thereby.

As shown in the example of FIG. 1, the share-based distributed consensus method according to an embodiment of the present invention has an effect of reducing the number of nodes that receive transactions to 1/10 of the original number. Also, as shown in Table 2, when n is set to the number of shares, the size of a consensus congress is reduced to 50, compared to the case in which the size is 61 when n is set to the number of nodes. Furthermore, when n is set to the number of nodes, a quorum size is 41, but when n is set to the number of shares, the quorum size is reduced to 14, whereby message complexity and the amount of traffic required for consensus are significantly reduced.

In addition, when each node has two or more different share values, as in the example of FIG. 7, difference services may be processed in parallel in a single blockchain. In the conventional method, a physical split into shards is required for such a parallel-processing effect, but according to the present invention, parallel processing is possible without performing splitting into groups.

According to the present invention, nodes for each block, which are randomly selected from among participating nodes, may be selected as a consensus congress while only some nodes receive transactions to be processed in a blockchain.

Also, the present invention may improve consensus performance by reducing the number of transactions to be transferred by limiting the number of nodes to receive the transactions to be processed, and may prevent a centralization problem by enabling all nodes to participate in a consensus process.

Also, the present invention may enable different services to be processed in parallel in a single blockchain using multiple shares of each node, without being physically split into groups.

As described above, the distributed consensus method, the distributed consensus apparatus, and the blockchain generation method according to the present invention are not limitedly applied to the configurations and operations of the above-described embodiments, but all or some of the embodiments may be selectively combined and configured, so the embodiments may be modified in various ways.

What is claimed is:

1. A method for distributed consensus, performed by an apparatus for distributed consensus, comprising:
   performing, by each of nodes forming a blockchain, an operation corresponding to a success probability (p) a number of times corresponding to a share value thereof;
   sending, by nodes having at least one share corresponding to the operation which is successful, a message for being selected as consensus nodes; and
   performing, by the consensus nodes, which are nodes having consensus shares selected from among the shares corresponding to the operation which is successful, distributed consensus,
   wherein the nodes forming the blockchain include major shareholder nodes for processing transactions, and
   wherein:
   when selected as the consensus nodes, the major shareholder nodes send a delegate request message including transactions, and
   nodes other than the major shareholder nodes, among the consensus nodes, send a delegate request message including no transactions.

2. The method of claim 1, wherein shares corresponding to the operation which is successful, among shares possessed by the major shareholder nodes, have priority for being selected as the consensus shares.

3. The method of claim 2, wherein the major shareholder nodes have an upper limit on a number of consensus shares capable of being assigned thereto.

4. The method of claim 2, wherein the major shareholder nodes are selected from among the nodes in descending order of shares possessed thereby.

5. The method of claim 4, wherein the major shareholder nodes are selected until a cumulative number of shares of nodes selected as the major shareholder nodes becomes equal to or greater than a preset proportion of all shares or until a number of nodes selected as the major shareholder nodes becomes equal to or greater than a preset number.

6. The method of claim 2, wherein the operation compares a random value generated using a nonce chain of a node performing the operation with a threshold corresponding to the success probability.

7. The method of claim 2, wherein the nodes have at least one additional share value along with the share value and process different kinds of services in parallel based on the share value and the additional share value.

8. The method of claim 7, wherein:
   the operation compares a random value generated using a nonce chain of a node performing the operation with a threshold corresponding to the success probability, and
   a nonce value corresponding to the nonce chain is shared between the share value and the additional share value.

9. An apparatus for distributed consensus, comprising:
   one or more processors; and
   executable memory for storing at least one program executed by the one or more processors,
   wherein:
   the at least one program is configured to
   perform an operation corresponding to a success probability (p) a number of times corresponding to a share value of each of nodes forming a blockchain,
   send a message for selecting nodes having at least one share corresponding to the operation which is successful as consensus nodes, and
   perform distributed consensus by using nodes having consensus shares, selected from among the shares corresponding to the operation which is successful, as the consensus nodes,
   wherein the nodes forming the blockchain include major shareholder nodes for processing transactions, and
   wherein:
   when selected as the consensus nodes, the major shareholder nodes send a delegate request message including transactions, and
   nodes other than the major shareholder nodes, among the consensus nodes, send a delegate request message including no transactions.

10. The apparatus of claim 9, wherein shares corresponding to the operation which is successful, among shares possessed by the major shareholder nodes, have priority for being selected as the consensus shares.

11. The apparatus of claim 10, wherein the major shareholder nodes have an upper limit on a number of consensus shares capable of being assigned thereto.

12. The apparatus of claim 10, wherein the major shareholder nodes are selected from among the nodes in descending order of shares possessed thereby.

* * * * *